J. KUSH, Jr.
SAFETY RAILROAD APPLIANCE.
APPLICATION FILED DEC. 10, 1913.
1,098,270.
Patented May 26, 1914.
3 SHEETS—SHEET 1.
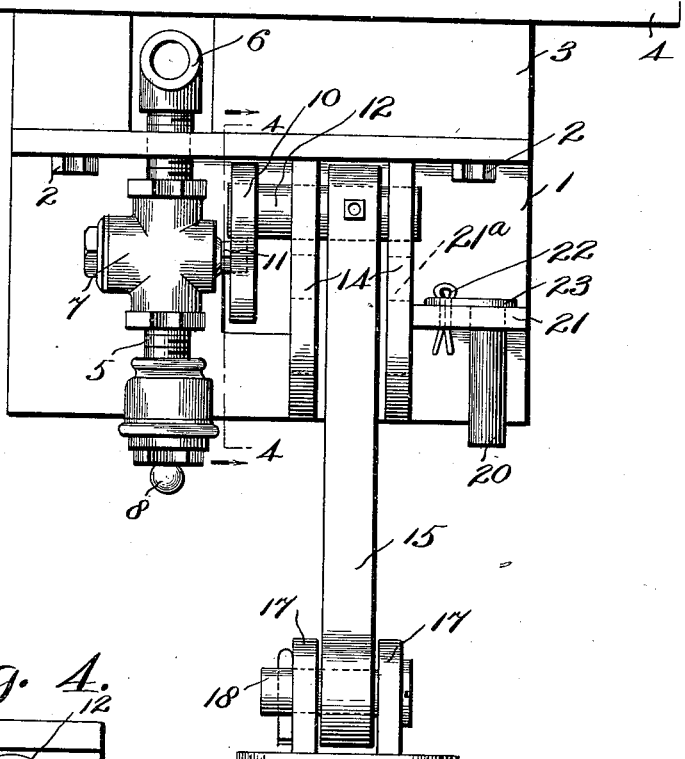
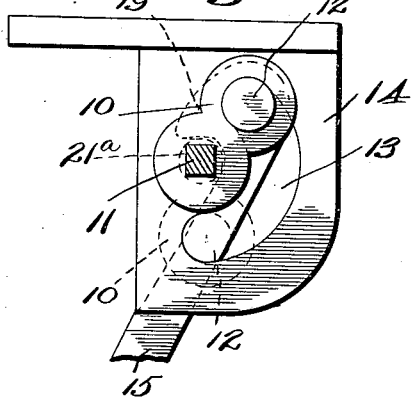
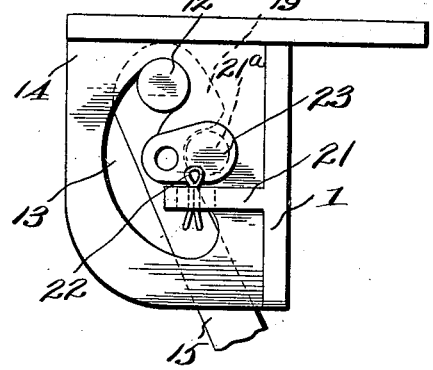
Inventor
John Kush, Jr.,
by Wilkinson, Giusta
& Mackey, Attorneys
Witnesses

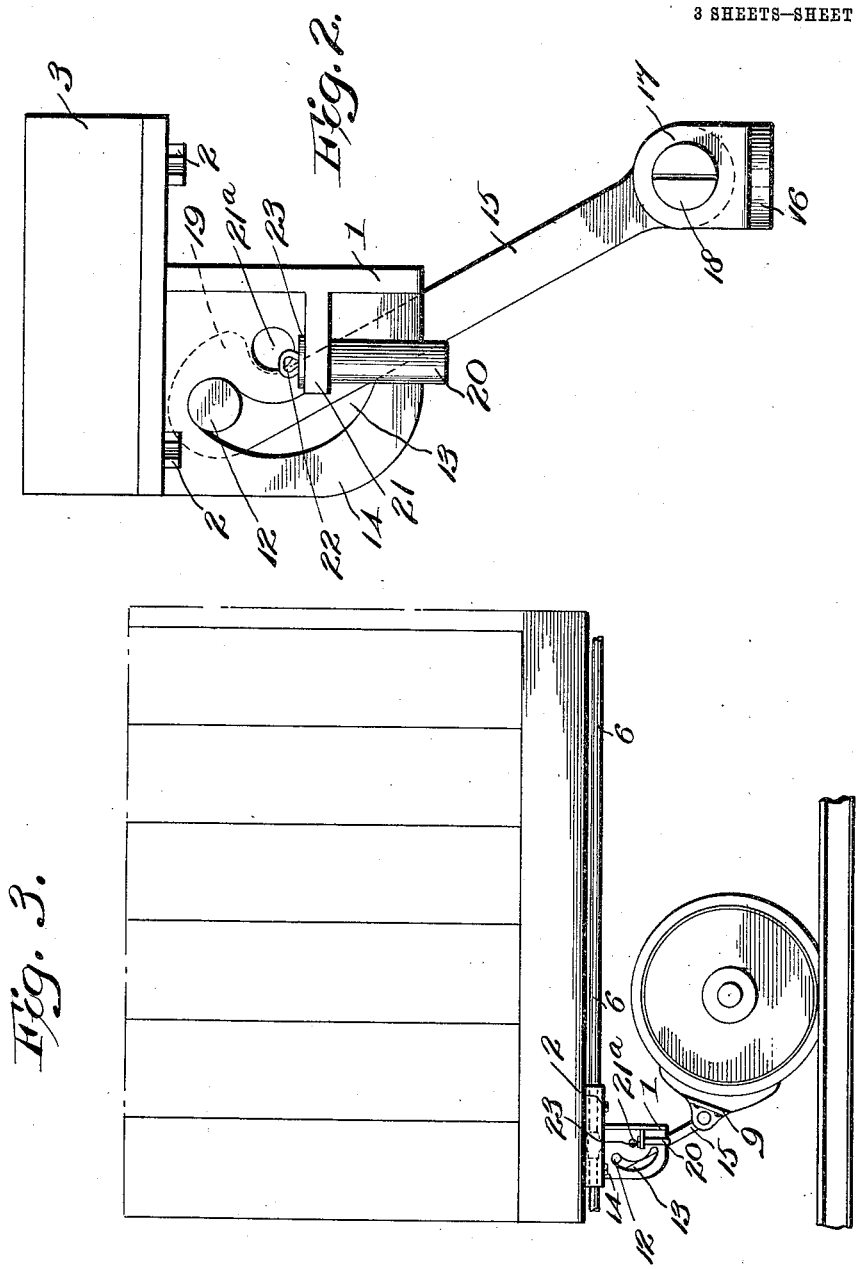

J. KUSH, Jr.
SAFETY RAILROAD APPLIANCE.
APPLICATION FILED DEC. 10, 1913.
1,098,270.
Patented May 26, 1914.
3 SHEETS—SHEET 3.
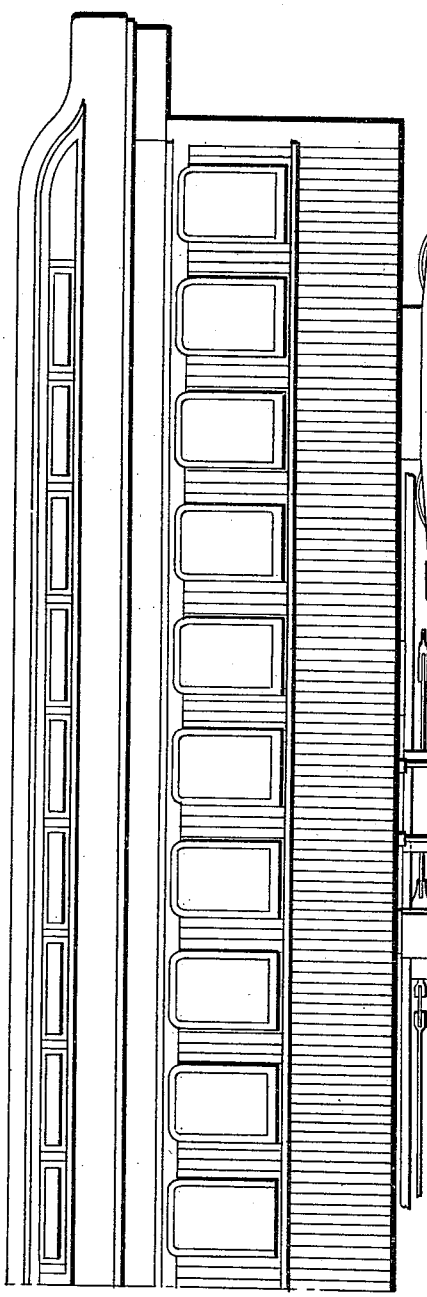
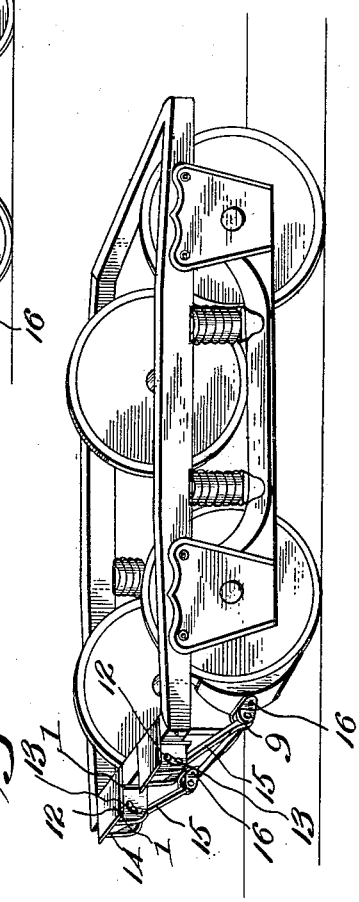

UNITED STATES PATENT OFFICE.

JOHN KUSH, JR., OF SAN ANTONIO, TEXAS.

SAFETY RAILROAD APPLIANCE.

1,098,270. Specification of Letters Patent. Patented May 26, 1914.

Application filed December 10, 1913. Serial No. 805,796.

*To all whom it may concern:*

Be it known that I, JOHN KUSH, Jr., a citizen of the United States, residing at San Antonio, in the county of Bexar and State of Texas, have invented certain new and useful Improvements in Safety Railroad Appliances; and I do hereby declare the following to be a full, clear, and exact description of the invention, such as will enable other skilled in the art to which it appertains to make and use the same.

The present invention relates to safety appliances for railway cars, and has for its purpose to provide an apparatus which may be readily installed in connection with the air brake system of a train and be automatically operated to bleed the air line and effect the applying of the brakes in the event of displacement of the brake beam and thereby avoid possible derailment of the car.

A further purpose of the invention is to provide an appliance of the character mentioned, having means for temporarily supporting the brake beam and closing the bleed valve, to the end that the train may remain under the normal control of the air brake system.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a front elevational view of the appliance and showing the same mounted on the car. Fig. 2 is a side elevational view of the same. Fig. 3 illustrates, in side elevation, the application of the invention to a car. Fig. 4 is a detail view taken on the line 4—4 of Fig. 1 and looking in the direction of the arrows; Fig. 5 is a detail showing the application of the emergency supporting device; and Figs. 6 and 7 illustrate the application of the invention to a car or car truck.

Referring to the construction in further detail, the appliance consists of a bracket 1, suitably secured by bolts 2 to the under-side of the cross beam 3 of the car 4. The bracket 1 has suitably mounted thereon a branch pipe 5, connected to communicate with the usual train line pipe 6 of the air brake system, and a bleed or relief valve 7 is mounted in said pipe and adapted to be operated to bleed the train line pressure, in a manner to be presently described.

The branch pipe 5 is provided at its lower end with a spring-seated ball valve 8, having for its purpose to normally close said pipe against the ingress of foreign matter. Said valve 8 is adapted to be unseated under the pressure of the air brake system when the valve 7 is opened, as will be readily understood.

The means for automatically opening the valve through the falling of the brake beam 9 comprises a lever 10 secured at one end to the valve stem 11, and at the other end to a pin 12 that is mounted to move within a pair of arcuate slots or guideways 13 formed in the pair of flanges 14 that are formed integral with a projection from the bracket 1. Said arcuate slots 13 are disposed concentric with the valve stem 11, or fulcrum of the lever 10. A link 15 connects the pin 12 with the brake beam 9 through the medium of a member 16 having lugs 17, between which the link is pivotally mounted on the pin 18.

To the end that the air brake system may be restored to normal and the fallen brake beam temporarily supported in position, the link 15 is constructed with a hook-end 19 adapted to be engaged and held in raised position through the medium of a pin 20 fitting within apertures 21 formed in the flanges 14 of the bracket. The pin 20 is shown in position for supporting the link 15 in Fig. 5. The bracket 1 is constructed with a horizontal flange 21 having an aperture through which the pin 20 fits, and a cotter pin 22 passes through the pin head 23 and the flange 21 (see Fig. 1), and normally holds said pin 20 against displacement. When the pin 20 is in position for engaging the hook 19 to support the link 15, the cotter pin 22 is inserted in the aperture formed in the flange 21 (see Fig. 5), to hold said pin in applied position.

It is obvious that those skilled in the art may vary the details of construction and arrangement of parts without departing from the spirit of my invention, and therefore I do not wish to be limited to such features except as may be required by the claims.

I claim:

1. The combination with a car having a train line air pipe and a brake beam, of a safety appliance comprising a normally closed valve connected to the air pipe; a valve actuating lever; members having guideways; a pin mounted to move in said guideways and connected to said lever; and a link connecting said pin and the brake beam operable to open the valve through the medium of said brake beam, substantially as described.

2. The combination with a car having a train line air pipe and a brake beam, of a safety appliance comprising a normally closed valve connected to the air pipe; a valve actuating lever; members having arcuate guideways disposed concentric with the lever fulcrum; a pin mounted to move in said guideways and connected to said lever; and a link connecting said pin and the brake beam operable to open the valve through the medium of said brake beam, substantially as described.

3. The combination with a car having a train line air pipe and a brake beam, of a safety appliance comprising a normally closed valve connected to the air pipe; a valve actuating lever; means connecting said lever and the brake beam operable to open the valve through the medium of said brake beam; and means for temporarily supporting the brake beam and closing the valves through said connecting means, substantially as described.

4. The combination with a car having a train line air pipe and a brake beam, of a safety appliance comprising a normally closed valve connected to the air pipe; a valve actuating lever; and a link connecting said lever and the brake beam operable to open the valve through the medium of said brake beam and provided with an off-standing member; said off-standing member providing a means for temporarily supporting the brake beam and closing the valve through said link connection, substantially as described.

5. The combination with a car having a train line air pipe and a brake beam, of a safety appliance comprising a normally closed valve connected to the air pipe; a valve actuating lever; members having guideways; a pin mounted to move in said guideways and connected to the lever; a link connecting said pin and the brake beam operable to open the valve through the medium of the brake beam, said link constructed with a hook-end; and a pin adapted to engage said hook-end and temporarily support the brake beam and close the valve through the medium of the link, substantially as described.

In testimony whereof, I affix my signature, in presence of two witnesses.

JOHN KUSH, Jr.

Witnesses:
C. A. Góeth,
E. B. Hucker.